March 24, 1953 — A. B. BELGARD — 2,632,257
SEGMENT MEASURING DEVICE FOR LENSES
Filed Aug. 30, 1951
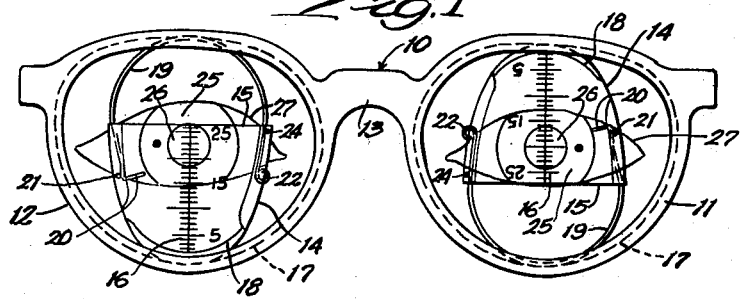
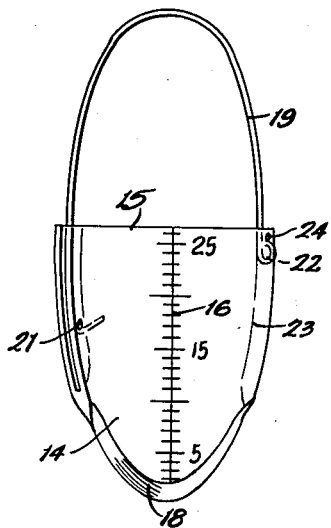
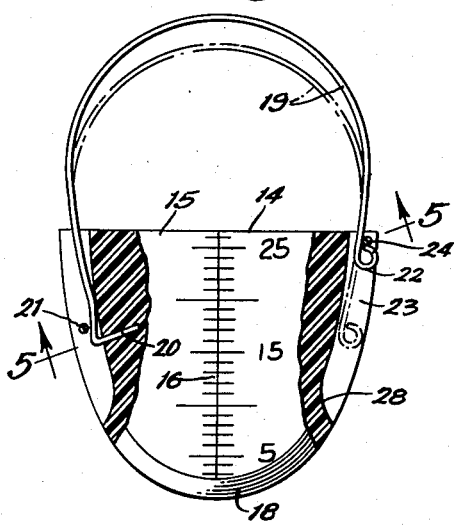
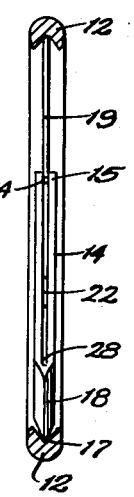
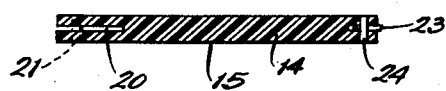
INVENTOR:
Austin B. Belgard,
BY
Dawson & Ooms,
ATTORNEYS.

Patented Mar. 24, 1953

2,632,257

UNITED STATES PATENT OFFICE 2,632,257

SEGMENT MEASURING DEVICE FOR LENSES

Austin B. Belgard, Evanston, Ill.

Application August 30, 1951, Serial No. 244,307

5 Claims. (Cl. 33—200)

This invention relates to a segment measuring device for spectacle lenses. The invention is particularly useful in measuring the eye for segment placement when a lens frame is in position upon the head of the wearer.

Heretofore it has been common practice to use a standard millimeter rule and similar means for determining bifocal lens segment size and placement for lenses within the lens frames, the top of the bifocal lens, etc. It was common to estimate or to attempt to approximate the framed, grooved depth in determining the critical aspect of lens dimension in the prescription.

There has long been a need for a simple, accurate device which would enable the optician to determine, in a modicum of time, the additional positioning of bifocal segments, etc., while at the same time providing a ready means for conveying this information to the lens maker.

An object of the present invention is to provide a device satisfying the above requirements and producing the new results described. A further object is to provide a measuring device which can be readily positioned within a lens frame while the same is upon the head of the wearer and permitting the professional man to accurately determine the best segment size and placement. A further object is to provide a transparent device enabling the optician to see the pupil in line with scale marks so that accurate measurements can be rapidly made while determining also that the eyelashes will not strike the lens, and enabling the optician also to determine readily the type of lens which should be used. Other specific objects and advantages will appear as the specification proceeds.

The invention is illustrated, in a specific embodiment, by the accompanying drawing, in which—

Fig. 1 is a front view in elevation of a lens frame, having no lenses therein, but equipped with measure devices mounted in the frame in front of the eyes of the wearer, said devices embodying my invention; Fig. 2, a perspective view of a measuring device embodying my invention; Fig. 3, a top plan view, a portion of the device being shown in section; Fig. 4, a vertical sectional view of the device; and Fig. 5, a sectional view, the section being taken as indicated at line 5—5 of Fig. 3.

In the illustration given, 10 designates a lens frame of a well known type, the frame being provided with the groove-equipped lens frames 11 at 12. The two frames are connected by the usual bridge 13.

In each of the frames 11 and 12 is mounted a measuring device 14. In the frame 11, the scale portion of the measuring device is turned upwardly while in frame 12 the scale portion of the measuring device is turned downwardly. In other words, the measuring or scale portion of the device is in opposite positions in the frames 11 and 12.

The measuring device 14 may be formed in a variety of ways. In the specific illustration given, I provide a transparent half-lens portion 15 formed of plastic or other suitable transparent material, and provided with a scale 16. The half-lens member 15 may be of any desired shape. It may be narrow, semi-circular, oval, or any one of a great variety of shapes. It is important that the member be sufficiently wide to carry the scale 16, and also that the lower portion of the member 15 fit within the lens groove 17 of the lens frame. Such grooves are shown in dotted lines in Fig. 1 by the numeral 17, and in full lines by the numeral 17 in Fig. 4. Since the groove 17 is usually concave or V-shaped, I prefer that the lower end portion 18 of the scale-bearing member 15 be similarly shaped so as to fit snugly within the groove, as indicated more clearly in Fig. 4.

In order to readily and accurately secure the measuring segment 15 within the lens frame 11 or 12, I secure to the member 15 a resilient spring 19 having an upwardly-extending arcuate portion adapted to be received within the groove 17 at the side of the frame opposite the segment engaged by the portion 18 of the member 15. In the illustration given, the spring 19 is provided with an inwardly-turned end portion 20 tightly fitted within a recess in the plastic body 15 and anchored therein by the pin 21. The opposite end of the spring 19 is preferably rolled upon itself to form a stop 22 and the stop or enlarged end portion 22 is slideably mounted within a slot 23 formed within one side portion of the scale segment 15. A pin 24 extends through the member 15 at the upper end of the slot 23 so as to confine the enlarged end 22 of the spring within said slot. Thus, the spring may readily move to the various positions indicated in dotted lines in Fig. 3, but when the spring is released, the pin 24 prevents it from moving upwardly and away from the slot 23.

Operation

In operation of the device, the lens frame is placed upon the wearer and the measuring device may be placed in position within the lens frame 12, as illustrated in Fig. 1, the lower end of the member 15 fitting within the lens groove 17 and the upper spring portion 19 fitting within the groove 17 at the top of the frame. The pressure exerted by the spring keeps the device in the desired vertical position and the professional man is able to see through the transparent lens segment 15 the eye 25 and the pupil 26, and also the eyelashes 27. He is then able to mark upon the lens just laterally of the scale, the proper height for the bifocal lens and to make other marks to indicate the best segment placement. He can determine that the eyelashes will not strike the lens and make any other marks indicating the type of lenses that are needed for the frames. The measure device permits actual visualization for the dispenser of best segment placement regardless of the head or eye position in any visual situation. The formal rule of thumb or close approximation of frame groove depth is eliminated by the measure device which is actually received within the grooves of the lens frame.

In double segment bifocals, etc., the measure device may be inverted, as illustrated in connection with frame 11 in Fig. 1, to permit determination of the most desirable and functional placement of the upper segment.

The elongated spring 19 permits the measuring device to be inserted with a minimum of effort, the enlarged head portion 22 sliding down readily through the groove 23 and, if necessary, beyond the groove 23, to permit the upper spring portion and the lower portion of member 15 to be received within the groove 17 of the lens frame. I prefer to have the groove 23 provided with an inner tapered wall 28 at its lower side so that the spring head 22 will be directed outwardly and below the member 15 in the case of extreme contraction of spring 19. It will be understood that other forms of springs or yielding members for positioning the measuring device quickly and accurately within the grooves of the lens frame may be employed.

While in the foregoing specification, I have set forth specific structure in considerable detail for the purpose of illustrating one embodiment of the invention, it will be understood that such details of structure may be varied widely by those skilled in the art without departing from the spirit of my invention.

I claim:

1. In a measuring device for lenses, a transparent lens segment provided with a scale and having a narrow end adapted to be received at one end into the groove of a lens frame, and a resilient member carried by said lens segment and engaging another portion of the lens frame for releasably securing said scale-equipped lens in the groove of said frame.

2. A segment placement measure device for lenses comprising a transparent lens segment provided with a scale, said segment having one narrow end portion adapted to be received within the groove of a lens frame, and a resilient member carried by said lens segment and receivable within the groove of another portion of said lens frame for releasably securing said scale-equipped lens in the groove of said frame.

3. In a measuring device for lenses, a transparent scale-equipped segment having a narrow end portion adapted to be received within the groove of a lens frame, and a spring anchored to said segment and adapted upon flexing to be inserted within the groove of the lens at a point opposite said segment.

4. In a measuring device for lenses, a transparent lens segment provided with a scale and having a narrow end portion adapted to be received within the groove of a lens frame, and a spring situated at one end of said lens and bent into an arcuate form with its opposite end slideably attached to the opposite side of said lens, whereby the arcuate portion of said lens may be flexed to insert it within the groove of said lens frame.

5. A measuring device, comprising a transparent plastic segment having a peripheral portion adapted to be received within the groove of a lens frame, said segment having grooves on opposite sides thereof, a spring member in the form of a loop having one end received within the groove on one side of said segment and the other end received within the groove on the opposite side of said segment, means for securing one of said ends physically within its groove, and means for confining the other end of said spring slidably within its groove in said segment.

AUSTIN B. BELGARD.

REFERENCES CITED

The following references are of record in the file of this patent:

UNITED STATES PATENTS

| Number | Name | Date |
|---|---|---|
| 1,675,407 | Dvorine | June 3, 1928 |
| 1,884,371 | Swart | Oct. 25, 1932 |